US012330758B2

(12) United States Patent
Vedel et al.

(10) Patent No.: US 12,330,758 B2
(45) Date of Patent: Jun. 17, 2025

(54) FUEL SUPPLY FOR A MARINE VESSEL

(71) Applicant: A. P. Møller-Mærsk A/S, Copenhagen K (DK)

(72) Inventors: Søren Vedel, Copenhagen K (DK); Julija Tastu, Copenhagen K (DK); Karin Wolffhechel, Copenhagen K (DK); Emil Banning Iversen, Copenhagen K (DK)

(73) Assignee: A. P. Møller-Mærsk A/S, Copenhagen K (DK)

( * ) Notice: Subject to any disclaimer, the term of this patent is extended or adjusted under 35 U.S.C. 154(b) by 271 days.

(21) Appl. No.: 17/941,525

(22) Filed: Sep. 9, 2022

(65) Prior Publication Data

US 2023/0002021 A1 Jan. 5, 2023

Related U.S. Application Data

(63) Continuation of application No. PCT/EP2020/058244, filed on Mar. 24, 2020.

(51) Int. Cl.
*B63B 79/20* (2020.01)
*B63B 79/30* (2020.01)
(Continued)

(52) U.S. Cl.
CPC .............. *B63B 79/20* (2020.01); *B63B 79/30* (2020.01); *B63B 79/40* (2020.01); *G01C 21/203* (2013.01)

(58) Field of Classification Search
CPC ......... B63B 79/20; B63B 79/40; B63B 79/30; B63B 71/00; B63H 21/38; G01C 21/3469;
(Continued)

(56) References Cited

U.S. PATENT DOCUMENTS

2010/0185471 A1 7/2010 Chen et al.
2015/0149136 A1 5/2015 Tervo
(Continued)

FOREIGN PATENT DOCUMENTS

CN 104507792 A 4/2015
CN 107748498 A 3/2018
(Continued)

OTHER PUBLICATIONS

International Search Report and Written Opinion dated Dec. 17, 2020 for International Application No. PCT/EP2020/058244.
(Continued)

*Primary Examiner* — Dale Moyer
*Assistant Examiner* — Tanner L Cullen
(74) *Attorney, Agent, or Firm* — EIP US LLP

(57) ABSTRACT

A marine vessel fuel control system may comprise an interface to receive data identifying the vessel and data identifying a voyage to be undertaken by the vessel. The control system may also comprise a memory to store program code to implement a predictive model and parameter values for the model, the values resulting from an optimisation of the model using historical data for marine vessels and voyages. The control system may also comprise a processor arranged to execute the program code to: instantiate the model using the values; supply the data identifying the vessel and the data identifying the voyage to be undertaken to the model; and apply the model to determine a fuel consumption estimate for the vessel for the voyage. A fuel supply system determines an amount of fuel to be supplied to at least one fuel tank of the vessel based on the fuel consumption estimate.

12 Claims, 4 Drawing Sheets

(51) Int. Cl.
  *B63B 79/40* (2020.01)
  *G01C 21/20* (2006.01)

(58) Field of Classification Search
  CPC ............... G01C 21/203; G01C 21/343; B60Y 2300/52; G06G 1/0063; G06Q 10/04; G08G 3/00
  See application file for complete search history.

(56) References Cited

U.S. PATENT DOCUMENTS

| | | | |
|---|---|---|---|
| 2016/0121979 A1 | 5/2016 | Asafuji et al. | |
| 2016/0195399 A1* | 7/2016 | Nanri | B63B 49/00 701/21 |
| 2016/0229500 A1* | 8/2016 | Ando | G06F 3/14 |
| 2016/0265920 A1 | 9/2016 | Yamaguchi et al. | |
| 2017/0146362 A1* | 5/2017 | Bai | G01C 21/3492 |
| 2018/0285788 A1* | 10/2018 | Andrei | G06F 16/287 |
| 2021/0010709 A1* | 1/2021 | Katyal | F24F 11/64 |
| 2021/0027225 A1* | 1/2021 | Mikalsen | B63B 79/40 |
| 2021/0047012 A1* | 2/2021 | Umemiya | B63B 79/20 |
| 2022/0010743 A1* | 1/2022 | Das | F02D 41/22 |
| 2022/0194533 A1* | 6/2022 | Stojanovic | B63B 79/10 |

FOREIGN PATENT DOCUMENTS

| | | |
|---|---|---|
| CN | 110083983 A | 8/2019 |
| KR | 1020150021971 A | 3/2015 |

OTHER PUBLICATIONS

Chinese Office Action dated Feb. 24, 2025 for Chinese Patent Application No. 202080098797.7.

\* cited by examiner

FUEL SUPPLY FOR A MARINE VESSEL

CROSS-REFERENCE TO RELATED APPLICATIONS

This application is a continuation of International Application No. PCT/EP2020/058244, filed Mar. 24, 2020, under 35 U.S.C. § 120. The above-referenced patent application is incorporated by reference in its entirety.

BACKGROUND

Field of the Invention

The present invention relates to the supply of fuel to a marine vessel. In particular, the present invention relates to a fuel control system and a method for a marine vessel, where a fuel consumption estimate is determined.

Description of the Related Technology

Marine vessels, such as container ships, play an important role in transporting cargo, goods and materials around the world. These vessels may be driven by diesel or natural gas propulsion systems that consume fuel to drive one or more propellers. These propellers may be driven directly, e.g. with slow-speed reciprocating diesel engines, or via a gearbox. Diesel engines may consume marine grade diesel or heavy fuel oil.

Fuelling a marine vessel is typically performed under the supervision of a vessel operator, such as a captain or one of the vessel's crew. Fuel may be supplied to fuel tanks for a voyage, and these fuel tanks may be refilled while in port if levels are low.

Modern shipping adds extra complexity to the fuelling of marine vessels. For example, container ships may navigate through a series of destinations on a round trip around the world. Containers may be exchanged at points along a route and conditions on each leg of the round trip may vary. This makes it difficult to estimate how much fuel needs to be loaded onto the marine vessel for each leg. It is not unknown for vessels to run out of fuel. In these cases, emergency refuelling at sea may be arranged (sometimes referred to as "replenishment at sea"). This can be risky.

There is thus a desire to improve how fuel consumption is estimated for marine vessels. In certain cases, there is a desire to improve how fuel is supplied to marine vessels.

SUMMARY

According to a first embodiment, there is provided a method for use with a marine vessel. The method comprises: obtaining data identifying the marine vessel and data identifying a voyage to be undertaken by the marine vessel; computing a fuel consumption estimate using a predictive model, the predictive model being configured to receive the data identifying the marine vessel and the data identifying the voyage to be undertaken as input, parameters for the predictive model being fitted using historical data for a plurality of marine vessels and a plurality of voyages; and determining an amount of fuel to be supplied to the marine vessel based on the fuel consumption estimate.

The fuel consumption estimate may be used to appropriately supply (i.e. load) a marine vessel with fuel for a voyage over one or more network legs. The fuel consumption estimate may help to optimally load a marine vessel to reduce fuel consumption and improve vessel efficiency, in turn reducing pollution levels. The fuel consumption estimate may also avoid emergency refuelling operations, such as refuelling at sea.

Optionally, the method comprises controlling the supply of the determined amount of fuel to the marine vessel.

Optionally, the data identifying the marine vessel comprises an indication of a class of the marine vessel, and the historical data for the plurality of marine vessels comprises indications of class for the plurality of marine vessels.

Optionally, the data identifying the voyage to be undertaken comprises an identification of a leg of a voyage, the leg of the voyage having an arrival port and a departure port, wherein the predictive model is configured to receive the identification of the leg of the voyage as input.

Optionally, the method comprises determining a distance between the arrival port and the departure port; and determining an estimated mean speed of the marine vessel for the voyage, wherein the predictive model is configured to receive the distance and the estimated mean speed as inputs.

Optionally, the predictive model is a linear model and parameters of the linear model are fitted using elastic net regularization.

Optionally, the predictive model comprises one or more of: parameters that are independent of the data identifying the marine vessel; parameters that are dependent on the data identifying the marine vessel; parameters that are independent of the data identifying the voyage to be undertaken by the marine vessel; and parameters that are dependent on the data identifying the voyage to be undertaken by the marine vessel.

Optionally, the method comprises: obtaining an initial fuel consumption estimate, wherein the predictive model is configured to receive the initial fuel consumption estimate as an input.

Optionally, the initial fuel consumption estimate is computed from data indicating how fuel consumption varies with speed of the marine vessel.

Optionally, the initial fuel consumption estimate is received as a user input.

Optionally, the marine vessel is configured to consume a plurality of fuel types, and wherein computing a fuel consumption estimate using a predictive model comprises computing fuel consumption estimates for the plurality of fuel types.

Optionally, computing fuel consumption estimates for the plurality of fuel types comprises: computing a first fuel consumption estimate for a first fuel type using a first predictive model; computing a second fuel consumption estimate for a second fuel type using a second predictive model, and determining an amount of fuel comprises determining an amount of each of the first and second fuel types that are to be supplied to the marine vessel based on the respective first and second fuel consumption estimates.

Optionally, the method comprises: obtaining an initial fuel consumption estimate for each of the first and second fuel types, wherein the first predictive model is configured to receive the initial fuel consumption estimate for the first fuel type as an input, and wherein the second predictive model is configured to receive the initial fuel consumption estimate for the second fuel type and an indication as to whether the initial fuel consumption estimate for the second fuel type is non-zero as inputs.

According to another embodiment a fuel control system for a marine vessel, comprises: an interface to receive data identifying the marine vessel and data identifying a voyage to be undertaken by the marine vessel; a memory to store computer program code to implement a predictive model and parameter values for the predictive model, the parameter values resulting from an optimisation of the predictive model using historical data for a plurality of marine vessels and a plurality of voyages; a processor to retrieve the computer program code and the parameter values from the memory. The processor is arranged to execute the computer program code to: instantiate the predictive model using the parameter values; supply the data identifying the marine vessel and the data identifying the voyage to be undertaken by the marine vessel to the predictive model; and apply the predictive model to determine a fuel consumption estimate for the marine vessel for the voyage. The fuel control system also comprises a fuel supply system to determine an amount of fuel that is supplied to at least one fuel tank of the marine vessel based on the fuel consumption estimate.

According to another embodiment, a non-transitory computer-readable storage medium stores instructions that, when executed by a processor, cause the processor to: obtain data identifying a marine vessel and data identifying a voyage to be undertaken by the marine vessel; determine a class of the marine vessel from the data identifying the marine vessel; determine a voyage leg identifier, a voyage duration, and a voyage speed based on the data identifying the voyage; obtain initial fuel consumption estimates for each of a first fuel type and a second fuel type, the initial fuel consumption estimates being based on a fuel consumption rate at the voyage speed for the marine vessel and the voyage duration; apply a first predictive model to output an adjusted fuel consumption estimate for the first fuel type, the first predictive model being a parameterised function of the initial fuel consumption estimate for the first fuel type, the class of the marine vessel, the voyage leg identifier, the voyage duration, and the voyage speed, parameters for the first predictive model being optimised based on historical data for a plurality of marine vessels and a plurality of voyages; apply a second predictive model to output an adjusted fuel consumption estimate for the second fuel type, the second predictive model being a parameterised function of the initial fuel consumption estimate for the second fuel type, the class of the marine vessel, the voyage leg identifier, the voyage duration, and the voyage speed, parameters for the second predictive model being optimised based on the historical data; determine an amount of fuel of the first fuel type to supply to the marine vessel based on the adjusted fuel consumption estimate for the first fuel type; and determine an amount of fuel of the second fuel type to supply to the marine vessel based on the adjusted fuel consumption estimate for the second fuel type.

BRIEF DESCRIPTION OF THE DRAWINGS

Embodiments of the invention will now be described, by way of example only, with reference to the accompanying drawings, in which.

DETAILED DESCRIPTION

Certain examples described herein provide methods and systems to estimate an amount of fuel for a voyage to be undertaken by a marine vessel. An estimate of fuel consumption may be used to control an amount of fuel that is to be supplied to the marine vessel, e.g. during a fuelling or refuelling operation. Certain examples provide estimates of fuel consumption for marine vessels that improve upon comparative approaches. Accurate estimates of fuel consumption enable optimal fuel loading of a marine vessel, e.g. the supply of enough fuel to complete the voyage but without oversupply which can affect loading and performance of the marine vessel.

Certain examples described herein enable fuel consumption estimates to be determined for different fuel types. This may allow improved supply of multiple fuel types for a voyage, where different fuel types may be suitable for different portions of a voyage. Certain examples apply a predictive model, where parameters of the predictive model may be fitted using historical data for a plurality of marine vessels and a plurality of voyages. The predictive model may comprise multiple parameters that control a computation applied to a set of inputs. The predictive model may take into account properties of a particular marine vessel and a particular voyage.

Figure 1:
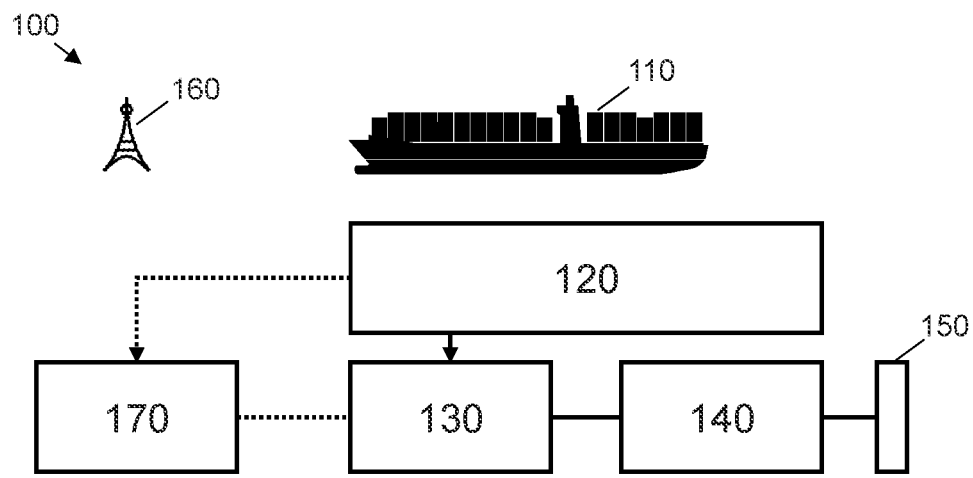
FIG. 1 shows a schematic view of a marine vessel according to an example.

FIG. 1 shows an example of a marine vessel 110 undergoing a refuelling operation. Although this example is described with reference to refuelling, the example may be equally applied to initial fuelling operations, e.g. for a new or refitted marine vessel. In one case, the marine vessel 110 may comprise a container ship. The marine vessel 110 may be designed to transport one or more of cargo, goods and materials from one port to another.

In FIG. 1 the marine vessel 110 comprises a fuel control system 120. The fuel control system 120 may comprise an electro-mechanical system installed upon the marine vessel 110 to control the supply of fuel to the marine vessel 110. The marine vessel 110 also comprises a fuel tank 130, an engine 140 and a propeller 150. The fuel tank 130 is arranged to store fuel for a voyage. The fuel tank 130 is arranged to supply fuel to the engine 140 during the voyage in order to power the engine 140. The engine 140 is configured to consume the fuel from the fuel tank 130 and rotate propeller 150 to propel the marine vessel 110 through a mass of water, such as a sea or waterway. Although a propeller 150 is used in this example, other propulsion mechanisms may alternatively be used. The engine 140 may comprise, amongst others, a diesel engine, a gas turbine or a liquefied natural gas (LNG) engine. If the marine vessel 110 comprises a container ship, the engine 140 may comprise a reciprocating diesel engine. The reciprocating diesel engine may be a two or four-stroke engine. In other examples, more than one propeller 150 may be present. In these examples, one engine may be provided per propeller, or one engine may power multiple propellers. Similarly, in other examples, more than one engine may be provided, each engine being coupled to one or more propellers. In certain cases, a backup engine may be provided as well as the main engine 140. The fuel that is supplied to, and stored by, the fuel tank 130 may depend on the engine 140 that is used. For a diesel engine, the fuel may comprise diesel fuel or fuel oil (including "heavy" and "residual" fuel oils). For an LNG engine, the fuel may comprise liquefied natural gas. For a gas turbine, the fuel may comprise petroleum oil. Other possible fuels include liquefied hydrogen. In one case, the fuel may comprise a charge stored by a battery that is used to power an electric engine.

FIG. 1 shows the marine vessel 110 docked at a refuelling station 160. The refuelling station may be located at a port or other destination accessible to the marine vessel 110. The refuelling station 160 comprises a bunker 170, which is arranged to store fuel for supply to marine vessels. The bunker 170 is couplable to the fuel tank 130 of the marine vessel 110 (indicated by the dashed lines). During a refuelling operation, the bunker 170 may be coupled to the fuel tank 130 to enable fuel to be supplied from the bunker 170 to the fuel tank 130. In FIG. 1, an amount of fuel that is to be supplied from the bunker 170 to the fuel tank 130 is controlled by the fuel control system 120 of the marine vessel 110. For example, the fuel control system 120 may communicate a numeric value to the refuelling station 110, and a refuelling mechanism forming part of the bunker 170 may measure an amount of fuel that is supplied to the fuel tank 130, e.g. using flow measurement sensors, and stop the supply of fuel to the fuel tank 130 when an amount of supplied fuel equals the numeric value (or is at least within a threshold amount of the numeric value).

Figure 2:
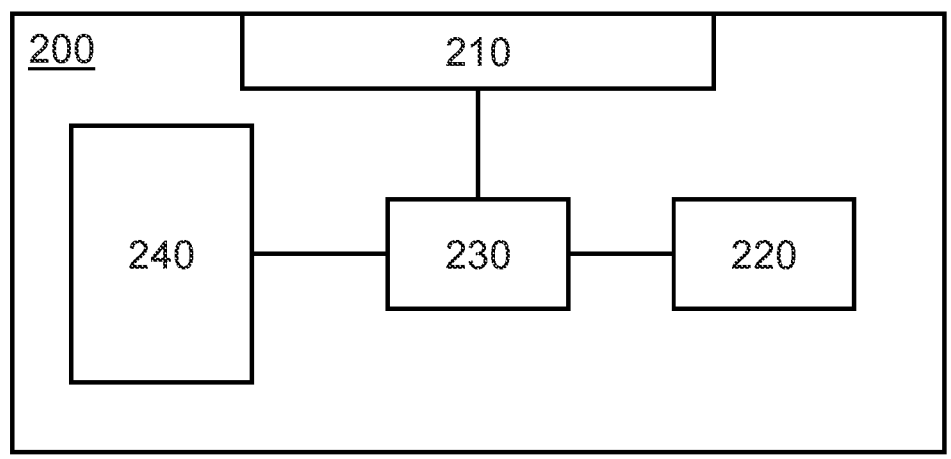
FIG. 2 shows a schematic view of a fuel control system for a marine vessel according to an example.

FIG. 2 shows a fuel control system 200 that may be used to implement the fuel control system 120 shown in FIG. 1. The fuel control system 200 comprises an interface 210, a memory 220, a processor 230, and a fuel supply system 240. The fuel control system 200 may be implemented as part of a control system for a marine vessel such as the marine vessel 110 in FIG. 1. In one case, the fuel control system 200 may comprise an embedded computing system that is installed upon a marine vessel.

The interface 210 may comprise an internal or external interface to the fuel control system 200. In FIG. 2, the interface 210 is shown as an external interface. The interface 210 may comprise a network interface that is arranged to receive data over a wired or wireless network. The interface 210 may, additionally or alternatively, comprise a user interface to receive data from a user. The data from the user may comprise data entered by the user and/or a selection of data stored in a memory, for example. If the interface 210 comprises an internal interface, it may provide an interface to a data storage device, such as a hard disk drive or solid-state memory. The interface 210 in FIG. 2 is communicatively coupled to the processor 230. The interface 210 is configured to receive data identifying a marine vessel and data identifying a voyage to be undertaken by the marine vessel. The marine vessel may be the marine vessel 110 shown in FIG. 1, e.g. the marine vessel in which the fuel control system 200 is installed. Although interface 210 is shown as a single interface in FIG. 2, it may comprise two separate interfaces that each receive one of the data identifying the marine vessel and the data identifying the voyage. For example, the data identifying the marine vessel may be received across a data interface that couples the fuel control system 200 to a data storage device of the marine vessel, and the data identifying the voyage may be selected from a list of possible voyages on a user interface.

In the example of FIG. 2, the memory 220 stores computer program code to implement a predictive model. The predictive model may comprise a machine learning model, including, amongst others, a linear model, a non-linear model (including logistic regression models), a neural network architecture, a support vector machine, a conditional random field, a Bayesian belief network, and decision trees. The computer program code may comprise machine learning libraries defined in one or more programming languages including R, Python, Java, C++, and JavaScript. The computer program code may define an out-of-the-box parameterizable model and/or may define a coupling and arrangement of lower-level components. In the present example, the memory 220 also stores parameter values for the predictive model. These may comprise, amongst others, weight values, bias values, hyperparameters, probability values, and parameters for one or more probability distributions. The parameter values may be used together with the computer program code defining the predictive model to instantiate the predictive model, i.e. to provide a particular configured instance of the predictive model. Although one memory 220 is shown in FIG. 2, in certain cases the memory 220 may comprise two separate memories, one to store the computer program code (e.g. such as an erasable read-only firmware memory) and one to store the parameter values (such as a random-access memory).

The predictive model is implemented by way of the computer program code from the memory 220 and the parameter values from the memory 220. The processor 230 is configured to retrieve the computer program code and the parameter values from the memory 220 and to execute the computer program code to determine a fuel consumption estimate for the marine vessel and the voyage, e.g. as identified using the data received at interface 210. The processor 230 is configured to execute the computer program code to first instantiate the predictive model using the parameter values. This may comprise, for example, loading values for weights of a linear model or values for weight and bias matrices in a neural network architecture. The parameter values result from an optimisation of the predictive model using historical data for a plurality of marine vessels and a plurality of voyages. Depending on the predictive model that is used, the optimisation may comprise a training or fitting stage, whereby the parameter values are determined by minimising a cost or loss function for data items within the historical data. The training or fitting stage is performed prior to determining a fuel consumption estimate. In one case, the training or fitting stage may be performed off-line and/or at a remote computing device, e.g. the parameter values may be retrieved over a network and loaded into the memory 220. The training or fitting stage may be periodically performed to update the parameter values based on new data.

Once the predictive model is instantiated by the processor 230, the processor 230 executes computer program code to supply the data identifying the marine vessel and the data identifying the voyage to be undertaken by the marine vessel to the predictive model. For example, the data identifying the marine vessel may comprise, or be mapped to, a numeric value representing the marine vessel in a set of marine vessels (e.g. by way of an array index or the like). The data identifying the voyage may similarly comprise, or be mapped to, a numeric value representing the voyage in a set of possible voyages. In another case, the data identifying the voyage may comprise data identifying properties of the voyage or be used to retrieve these properties in a pre-processing operation. For example, properties of the voyage may comprise one or more of, amongst others, voyage distance, voyage duration, normal voyage speed, network leg (e.g. in a multi-leg trip), arrival port, and destination port. These properties may be provided as a numeric value (e.g. distance may comprise a distance value in kilometres or a network leg may be identified by an integer array index).

The term "voyage" may refer to either a network leg or a plurality of network legs, depending on the configuration of the predictive model.

The predictive model may be configured to receive an array or N-dimensional data structure as an input. The array may comprise a multi-dimensional array. The predictive model may implement one or more functions in its application to determine a fuel consumption estimate for the marine vessel for the voyage. The predictive model may provide the fuel consumption estimate as an output. The fuel consumption estimate may be a continuous or integer value (e.g. may be a float data type in the former case) indicating an amount of fuel that the model predicts will be consumed on the voyage. The fuel consumption estimate may be provided as an amount in tonnes, litres or US gallons. This output may be stored in volatile or non-volatile memory and/or communicated to other components via a systems bus.

In the example of FIG. 2, the fuel consumption estimate, as computed by the processor 230 applying the predictive model, is accessible to the fuel supply system 240. The fuel supply system 240 is configured to determine an amount of fuel to be supplied to at least one fuel tank of the marine vessel based on the fuel consumption estimate. For example, the fuel supply system 240 may send data indicating the fuel consumption estimate to the refuelling station 160 shown in FIG. 1 to arrange for an amount of fuel to be supplied from the bunker 170 to the fuel tank 130 based on the fuel consumption estimate. In another case, the fuel supply system 240 may control a fluid flow system (e.g. one or more valves) that control the supply of fuel to the fuel tanks 130 in FIG. 1. If the refuelling station 160 is a legacy refuelling station, the fuel supply system 240 may provide the fuel consumption estimate via a user interface to enable manual control of the fuel supply according to the fuel consumption estimate.

In certain cases, the historical data used to optimise the predictive model may comprise data indicating recorded fuel consumption for a plurality of marine vessels for a plurality of voyages. The plurality of marine vessels may or may not include the marine vessel associated with the present fuel control system 200. If the marine vessel associated with the present fuel control system 200 is a new or refitted vessel, then the predictive model may be constructed to ignore function terms associated with the marine vessel, e.g. in certain cases, in effect ignoring any contribution in the predictive model that is based on a particular marine vessel. In these cases, there may remain function terms that are associated with marine vessels in general that are independent of any specific marine vessel. In certain cases, data identifying a new or unseen marine vessel may be processed by the predictive model to have a casual effect on any fuel consumption estimate.

Although the fuel control system 200 is described with reference to the fuel control system 120 of FIG. 1, in one case it may be implemented outside of the marine vessel 110. For example, the fuel control system 200 may form part of a control system installed as part of the refuelling station. In yet another case, the fuel control system 200 may comprise a remotely-located control system that is configured to send data to one or more of the marine vessel 110 and the refuelling station 160 to arrange for an amount of fuel to be supplied to the marine vessel. For example, the interface 210 may receive data from the marine vessel 110 over a wireless communications link and send out a fuel consumption estimate as processed by the fuel supply system 240. One or more of the marine vessel 110 and the refuelling station 160 may comprise a control system with a corresponding interface to receive the fuel consumption estimate and arrange for supply of an amount of fuel based on this estimate. In one case, certain components of the fuel control system 200 shown in FIG. 2 may be distributed between two or more of the marine vessel 110, the refuelling station 160 and a remote data processing site. For example, the fuel supply system 240 may be located locally on the marine vessel 110 or the refuelling station 160.

A fuel control system similar to that shown in one or more of FIGS. 1 and 2, enables an accurate amount of fuel to be supplied for use by the marine vessel. By using a predictive model trained using historical data, an accurate estimate may be provided that reduces a risk of the marine vessel running out of fuel during a voyage while also avoiding supplying the marine vessel with too much fuel, which may result in a reduced loading capacity or a reduced efficiency. For example, a marine vessel having a fixed capacity may consume more fuel if it is loaded with more fuel than is needed for a voyage. Hence, fuel consumption estimates provided by the present examples may allow a marine vessel to operate more efficiently and reduce pollution and fuel consumption. By avoiding the marine vessel running out of fuel at sea, risky replenishment at sea may be avoided, increasing a safety of the vessel's crew. An accurate fuel estimate is especially useful for large container ships (e.g. up to 10,000 or more twenty-foot equivalent units—TEU). For example, a large container ship can consume between 10,000 to 14,000 litres of heavy fuel oil per hour, where fuel for one hour can weigh between 10 and 15 tonnes (10-15× $10^3$ kg).

Figure 3:
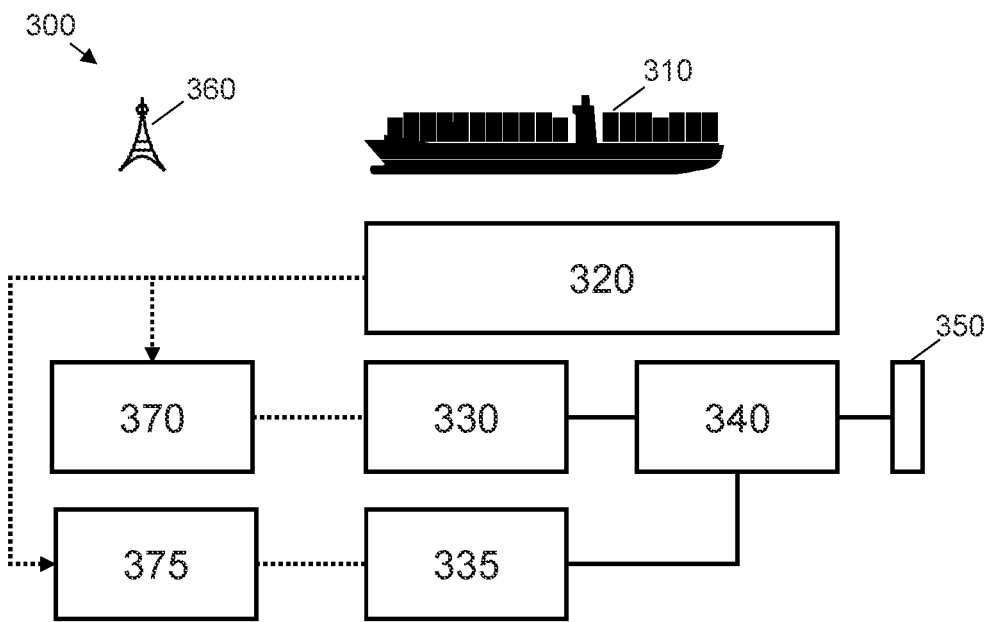
FIG. 3 shows a schematic view of a marine vessel that uses multiple fuel types according to an example.

Certain examples described herein may be adapted to provide fuel consumption estimates for multiple fuel types. FIG. 3 provides an example 300 that is an adaptation of the example of FIG. 1 where the marine vessel 310 comprises a fuel control system 320 that determines a fuel consumption estimate for a first fuel type and a second fuel type. In this example, the marine vessel 310 has a fuel tank for each fuel type: a first fuel tank 330 is used to store fuel of a first type and a second fuel tank 335 is used to store fuel of a second type. In the example of FIG. 3, fuels of either type may be used to supply the engine 340 to drive the propeller 350. In other examples, there may be a separate engine for each fuel type.

In FIG. 3, a refuelling station 360 comprises a bunker for each fuel type. The first fuel tank 330 is couplable to a first bunker 370 supplying the first fuel type and the second fuel tank 335 is couplable to a second bunker 375 supplying the second fuel type. In other examples, a refuelling station may only have bunkers supplying a subset of fuel types (e.g. have a bunker to supply the second fuel type but not the first fuel type). In certain other examples, a single bunker may have separated compartments for different fuel types. In FIG. 3, the first and second bunkers 370, 375 may be respectively coupled to the first and second fuel tanks 330, 335, when the marine vessel 310 is docked at the refuelling station 360 (as shown by the dashed lines). In the present example, while docked, the fuel control system 320 may communicate, e.g. via a wired or wireless communication channel, with the refuelling station 360, including communicating with refuelling mechanisms associated with the first and second bunkers 370, 375.

The fuel control system 320 may be implemented in a similar manner to the fuel control systems 120 and 200 of FIGS. 1 and 2. In the example of FIG. 3, the fuel control system 320 is configured to compute fuel consumption estimates for a plurality of fuel types that include the first fuel type and the second fuel type. In one case, a common predictive model may be used for both fuel types. In this case, the common predictive model may have different parameters for each fuel type, resulting in different instantiated models for each fuel type. Alternatively, in this case, the common predictive model may implement a joint model and provide a multidimensional output representing fuel consumption estimates for multiple fuel types. In other cases, different predictive models may be used for the different fuel types, e.g. using a different neural network architecture or different model components. In both cases, a first fuel consumption estimate is generated for the first fuel type and a second fuel consumption estimate is generated for the second fuel type. The two fuel consumption estimates may be used to determine an amount of fuel for the different fuel types to supply from the respective bunkers 370, 375 to the respective fuel tanks 330, 335, e.g. in a similar manner to that described for a single fuel type in FIG. 1.

In certain cases, if two predictive models are used for each respective fuel type, an output of one of the predictive models may be used as an input to another of the predictive models. In one case, a desired proportion of each fuel type may be supplied as an input to the predictive model. This may be used as a constraint in the predictive model. In certain cases, properties of the marine vessel and/or the voyage to be undertaken may be used as inputs to one or more of the predictive models. These again may be used as constraints in the predictive models. For example, the fuel tanks 330, 335 may be of different capacities or the different fuel types may be consumed at different rates by the engine 340 (or multiple different engines). Similarly, one fuel type may not be suitable for use on at least a portion of a voyage, e.g. a voyage may have a route via a canal such as the Suez or Panama Canal where certain fuel types may not be suitable due to the confined spaces of the location.

In one case, the different fuel types may comprise fuel types that cannot be mixed, e.g. liquefied natural gas and heavy fuel oil. In other cases, the different fuel types may be mixed, e.g. different grades of heavy fuel oil, or one fuel type with additives for periodic engine maintenance and one fuel type without additives. Mixable fuel types may be mixed in a fuel tank, in a feed for an engine and/or in the engine itself. In one case, a first fuel type comprises fuel oil with a first chemical composition, e.g. a first level of sulphur, and a second fuel type comprises fuel oil with a second chemical composition, e.g. a second level of sulphur, where the first level differs from the second level.

In certain cases, applying the computations of the fuel control system 320 to provide fuel estimates across multiple voyages (or across one voyage with multiple legs), enables enough fuel of each fuel type to be supplied for the voyages. This may be useful in cases where a particular fuel type is not available at one or more end destinations.

Figure 4:
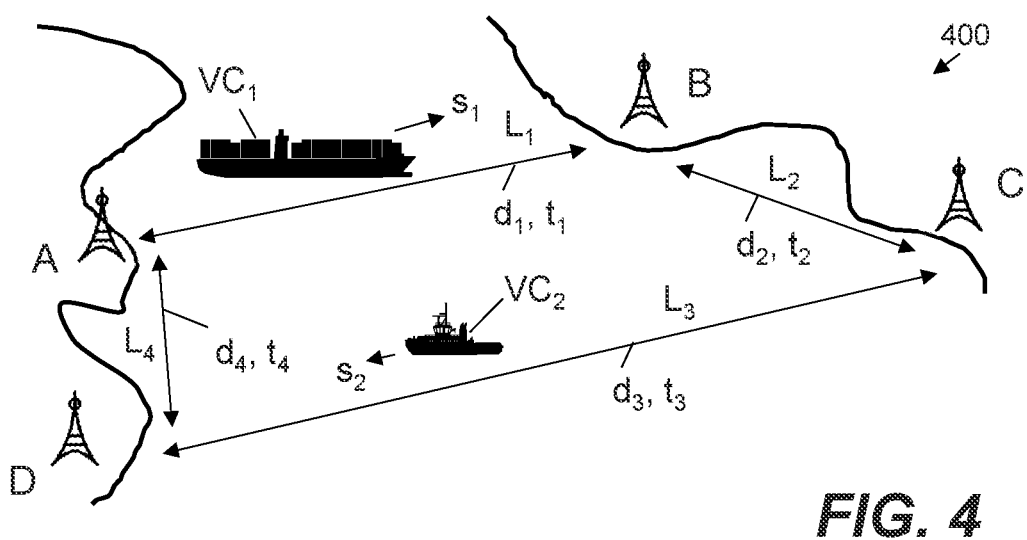
FIG. 4 shows a schematic view of variables that may be used to generate a fuel consumption estimate according to an example.

FIG. 4 shows an example 400 of a voyage that may be undertaken by a marine vessel. The example 400 will be used to describe certain inputs that may be provided to the predictive model. In certain cases, variables may be provided in one form, and the computation of variables of a different form may result implicitly from a function applied by the predictive model, and/or may result from one or more pre-processing stages of the predictive model. FIG. 4, as per the other examples, is a schematic illustration that provides a necessary simplification in order to demonstrate certain concepts relevant to the present implementations.

FIG. 4 shows a voyage comprising four network legs: $L_1$, $L_2$, $L_3$ and $L_4$. Network leg $L_1$, extends between departure port A and arrival port B; network leg $L_2$ extends between departure port B and arrival port C; network leg $L_3$ extends between departure port C and arrival port D; and network leg $L_4$ extends between departure port D and arrival port A. The voyage of the example is a round trip, i.e. a marine vessel starts and ends at port A. Although the term "port" is used in this example, departure and/or arrival locations need not be a port in the normal sense, they may comprise an offshore rig, mooring location, stopping location and/or refuelling station, e.g. be independent of any cargo loading and unloading. In one case, a marine vessel may comprise a cargo ship and so cargo may be loaded and/or unloaded at one or more of ports A to D.

Each network leg may be identified using a unique identifier, e.g. in a predefined list of global and/or local shipping routes. Each network leg may be considered to be a portion of a larger voyage or a voyage in itself. Each network leg $L_i$, has an associated leg distance $d_i$. In the present example, each network leg $L_i$ also has an estimated duration $t_i$. The leg distance may be a port-to-port distance, e.g. between departure and arrival ports. The leg distance may comprise a geographic point-to-point distance and/or may comprise a distance of a particular route between two points. For example, if a particular network leg has to avoid certain territories or regions due to known geographical features (such as rock outcrops or islands) and/or piracy risks, the leg distance $d_i$ may be longer than a point-to-point distance. The leg distance may be provided as a numeric value indicating a distance in kilometres. In certain cases, a leg distance may be retrieved from local or remote data storage based on a network leg identifier. The leg distance may be updated over time, e.g. retrieved from a remote repository of updated leg distances. The leg duration may be a time estimate for completing the network leg.

FIG. 4 shows two marine vessels that are undertaking the round trip. There is a first marine vessel of a first vessel class $VC_1$ and a second marine vessel of a second vessel class $VC_2$. The marine vessel class may comprise a group of vessels or ships of a common design. A marine vessel class may be distinguished from a marine vessel type, which may indicate capacity and/or intended use. The data identifying the marine vessel may indicate one or more of a marine vessel class and type. A marine vessel class may be set by a maritime classification society and may conform to one or more standards, e.g. those defined by the International Maritime Organization (IMO). A marine vessel may be assigned a predefined number or code that identifies the class. One or more of a marine vessel class and type may be indicated by a code or an integer index for a list of predefined classes or types. The input to the predictive model and the historical data use a consistent set of classes and/or types. Using an indication of a marine vessel class and/or type enables the predictive model to model factors specific to the class and/or type. This may improve an accuracy of the fuel consumption estimate. A class and/or type may also be provided representing an "unknown" or "other" category, if a marine vessel does not relate to any pre-existing class or type. A marine vessel class may influence how distance and speed are processed by the predictive model, e.g. may result in parameters that model specific interactions between marine vessel class and distance and/or speed.

FIG. 4 also shows that the two marine vessels have a designated speed $s_1$ and $s_2$. The designated speed may be a proposed average speed for a network leg. It may be supplied as an independent variable or be set based on the vessel class or type. It may also be determined by dividing the leg distance by the leg duration, i.e. $d_i/t_i$. In certain cases, one or more of the speed $s_i$, distance $d_i$, and duration $t_i$ may be retrieved based on a look-up operation on a set of historical data based on the data identifying the marine vessel and/or the data identifying the voyage. For example, the speed $s_i$, distance $d_i$ and duration $t_i$ may be retrieved based on averages for a particular identified marine vessel and network leg. In certain cases, only two of the speed $s_i$, distance $d_i$ and duration $t_i$ may be retrieved and the third variable may be computed accordingly.

One or more of the marine vessel class, $VC_j$, the network leg $L_j$, the speed $s_i$, distance $d_i$ and duration $t_i$ may be provided as numeric inputs to the predictive model to compute a fuel consumption estimate for the particular marine vessel and network leg. Fuel consumption estimates for each individual network leg may be combined to provide estimates for the round trip, or different voyage portions.

In one case, the predictive model may also receive an initial fuel consumption estimate. In this case, the initial fuel consumption estimate may be a "coarse" estimate that is refined by the predictive model. The initial fuel consumption estimate may be provided by a member of a vessel's crew or refuelling staff, e.g. based on experience. In another case, the initial fuel consumption estimate may be provided by an initial computation, e.g. an output of a legacy fuel control system. The legacy fuel control system may operate using data that indicates a speed curve or fuel table.

Figure 5:
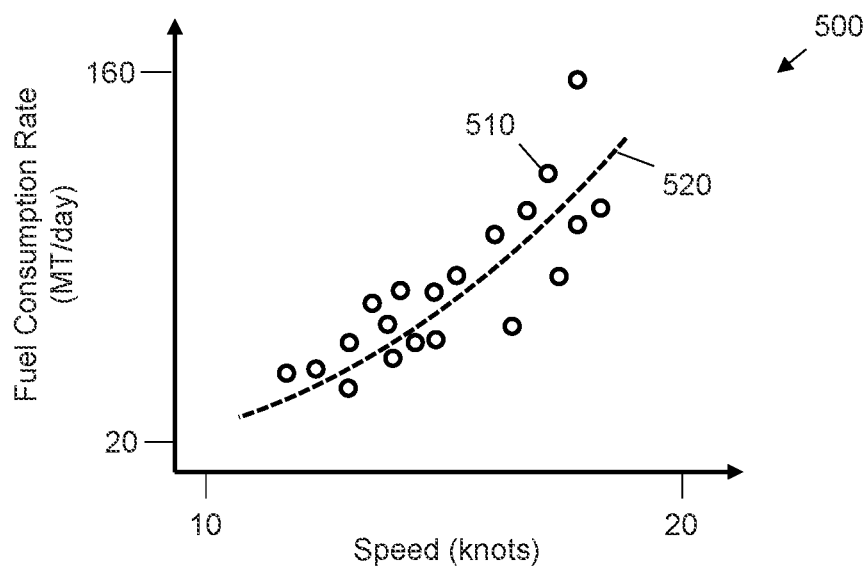
FIG. 5 shows a chart illustrating example data indicating how fuel consumption varies with speed of the marine vessel.

FIG. 5 shows a chart 500 indicating how a legacy fuel control system may compute an initial fuel consumption estimate according to an example. The chart 500 shows data 510 that indicates how a fuel consumption rate (e.g. in mega-tonnes per day) may vary with speed (in knots). The data 510 may represent recorded and/or modelled data. A curve 520 may be fitted to the data 510. The chart 500 may be unique to a particular marine vessel or marine vessel class. In one case, the relationship shown by the chart 500 may be provided as a data table or the like as part of a specification for a particular marine vessel or marine vessel class. A legacy fuel control system may compute an initial fuel consumption estimate by retrieving data indicating the relationship shown in chart 500, determining a fuel consumption rate for a designated speed for a voyage (e.g. $s_i$ from FIG. 4), and then multiplying that fuel consumption rate by a voyage duration in days. The resultant initial fuel consumption estimate may be supplied as a numeric value to the predictive model. Similarly, the historical data used to train the predictive model may also include fuel consumption estimates for recorded voyages from the legacy fuel consumption system. Used in this way, the fuel control system described herein may be retrofitted to upgrade an existing legacy fuel control system, e.g. as provided on an older marine vessel.

In one case, if a legacy fuel control system outputs an initial fuel consumption estimate for multiple fuel types, the predictive model may comprise a flag or other input variable that indicates whether fuel of one or more types will be consumed for a particular network leg.

In certain cases, the predictive model may be implemented using a linear model that operates on one or more of marine vessel speed, network leg distance and initial fuel consumption estimate. Parameter values in this case may provide one or more of: a bias term that is independent of the vessel class and network leg, a bias term that is dependent on the vessel class, a bias term that is dependent on the network leg, a weight term for the speed that is independent of the vessel class and network leg, a weight term for the speed that is dependent on the vessel class, a weight term for the distance that is independent of the vessel class and network leg, a weight term for the distance that is dependent on the vessel class, a weight term for the initial fuel consumption estimate that is independent of the vessel class and network leg, a weight term for the initial fuel consumption estimate that is dependent on the network leg, a weight term for the product of speed and distance that is independent of the vessel class and network leg, and a weight term for the product of speed and distance that is dependent on the vessel class. A predictive model for a particular fuel type may comprise parameter values that are specific to the fuel type. In certain cases, a non-zero initial fuel consumption estimate from a legacy fuel control system may be used as a binary variable where one or more weight and/or bias terms are provided with respect to this binary variable and/or one or more of the vessel class or network leg specific terms. The binary variable may be used by a predictive model, e.g. for a second fuel type, as an indicator that enables parts of the predictive model to be switched on and off.

Figure 6:
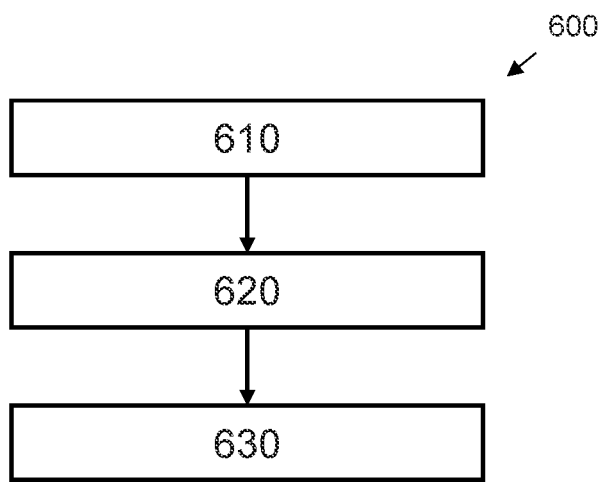
FIG. 6 shows a flow chart illustrating a method for use in fuelling a marine vessel according to an example.

FIG. 6 shows a method 600 of fuelling a marine vessel according to an example. The method 600 comprises three blocks 610, 620 and 630.

At block 610, data is obtained identifying the marine vessel and identifying a voyage to be undertaken by the marine vessel. This for example may comprise receiving or retrieving a vessel identifier or class identifier for the marine vessel. The identifier may be a unique code, a string label mapped to an integer value or a multidimensional array representing an embedding for the marine vessel. The data identifying a voyage to be undertaken may comprise identifiers for one or more network legs of a shipping route. The data may be received and/or selected using a user interface, received over a network connection and/or retrieved from a storage device or memory.

At block 620, a fuel consumption estimate is computed using a predictive model. The predictive model is configured to receive the data identifying the marine vessel and the data identifying the voyage to be undertaken as input. If the data identifying the voyage comprises multiple network leg identifiers, block 620 may be repeated for each network leg. In the present example, parameters for the predictive model are fitted using historical data for a plurality of marine vessels and a plurality of voyages. For example, the predictive model may comprise a linear model, a logistic regression model or a neural network architecture and may be trained on the historical data. The historical data may comprise a plurality of data samples, each data sample providing at least a triple of data identifying a historical marine vessel, data identifying a network leg that has been traversed in the past, and data indicating recorded fuel consumption for the historical marine vessel for the traversed network leg. The term "historical" is used here to refer to data from past points in time; it can include marine vessels and network legs that are still in operation.

At block 630, an amount of fuel to be supplied to the marine vessel is determined based on the fuel consumption estimate. This may comprise controlling fluid supply apparatus such as pumps, valves and the like to supply the amount of fuel to the marine vessel. It may also comprise communicating the fuel consumption estimate and/or the amount of fuel to a remote system to instruct a fuelling or refuelling operation.

The method 600 may be repeated for a fleet of vessels across a network of shipping routes. The method 600 may be repeated for a number of voyages in a predefined period of time. The set of fuel consumption estimates may be used to control refuelling of bunkers and refuelling stations as well as vessels. The set of fuel consumption estimates may be stored and compared with actual measured fuel consumption by the marine vessel. The predictive model may be updated as more data is received, e.g. may be continuously or periodically retrained to take into account new data and update the parameter values.

In certain cases, the data identifying the marine vessel comprises an indication of a class of the marine vessel, and the historical data for the plurality of marine vessels comprises indications of class for the plurality of marine vessels. For example, there may be 10 classes of marine vessel in a fleet. These classes may be identified using an IMO code or number. A list of available classes may be generated, and each string or number class may be mapped to an integer representing an index in the list. The predictive model may be configured to receive an integer value representing a marine vessel class as an input, e.g. as one dimension of an input array.

In certain cases, the data identifying the voyage to be undertaken comprises an identification of a leg of a voyage. This leg or network leg may have an associated arrival port and an associated departure port, e.g. as shown in the example 400 of FIG. 4. Similar to the case above, a list of network legs may be compiled, e.g. representing portions of known shipping routes. This may be presented as a list, where a particular network leg, e.g. as identified by a string or number identifier, may be mapped to an integer representative of an index in the list. The integer representation of the network leg may then be supplied to the predictive model as an input, e.g. as one dimension of an input array.

In certain cases, the data identifying the voyage comprises, or is used to retrieve or compute, one or more of a distance between an arrival port and a departure port, and an estimated mean speed of the marine vessel for the voyage. These may be supplied as continuous data values (e.g. as a float or long data type). They may be supplied to the predictive model as an input, e.g. each forming one dimension of an input array.

In one case, the predictive model comprises one or more of: parameters that are independent of the data identifying the marine vessel; parameters that are dependent on the data identifying the marine vessel; parameters that are independent of the data identifying the voyage to be undertaken by the marine vessel; and parameters that are dependent on the data identifying the voyage to be undertaken by the marine vessel. In one case, the predictive model is a linear model and parameters of the linear model are fitted using elastic net regularization. In another case, the predictive model is a neural network architecture and parameter values are fitted using back-propagation and stochastic gradient descent. Elastic net regularization may be used to remove unimportant predictor variables, where interactions among input variables are considered. Removal of variables by elastic net regularization may be specific to each combination of vessel class and network leg. This can enable, in effect, construction of bespoke models for each combination of vessel and network leg.

In one case, the method comprises, prior to block 620, obtaining an initial fuel consumption estimate. This may comprise an estimate from a legacy fuel control system, e.g. as described with reference to FIG. 5, and/or an estimate from a crew member, e.g. as supplied via a user interface. In this case, the predictive model may be configured to receive the initial fuel consumption estimate as an input, e.g. as another dimension of an input array.

In one case, block 620 comprises computing fuel consumption estimates for a plurality of fuel types that are useable on the marine vessel. This may comprise computing a first fuel consumption estimate for a first fuel type using a first predictive model and computing a second fuel consumption estimate for a second fuel type using a second predictive model. Alternatively, a common predictive model may be arranged to output a two-dimensional array comprising an estimate for each fuel type as each array element (e.g. [$FC_1$, $FC_2$]) In one case, block 630 comprises determining an amount of each of the first and second fuel types that are to be supplied to the marine vessel based on the respective first and second fuel consumption estimates, e.g. as described with reference to FIG. 3. If a second predictive model is used, it may be configured to receive the initial fuel consumption estimate for the second fuel type and an indication as to whether the initial fuel consumption estimate for the second fuel type is non-zero as inputs. In certain cases, the predictive model for one or more of the fuel types may comprise a hard constraint such that the predictive model only outputs a non-zero fuel consumption estimate if an initial fuel consumption estimate, e.g. from a legacy fuel control system, is non-zero. The predicative models for each fuel type may have separate sets of parameter values, e.g. in this case parameter values are not shared between the first and second predictive models. In other cases, there may be parameter sharing.

In one case, an input array for the predictive model may comprise [VC, L, s, d, LFC], where VC is an integer value representing a marine vessel class, L is an integer value representing a network leg, s is a numeric value representing a vessel speed, d is a numeric value indicating a port-to-port distance for the network leg, and LFC is a legacy or initial fuel consumption estimate for a particular fuel type. Hence, in one implementation the input to the predictive model may comprise a 1×5 array. In certain cases, multiple legacy fuel consumption estimates may be provided for each fuel type. An output for the predictive model may comprise a single numeric value representing the fuel consumption estimate and/or an array of numeric values representing the fuel consumption estimates for a set of fuel types. The method 600 may comprise processing one or more of the data obtained at block 610 and the historical data into a defined input format (e.g. a 1×5 array as above).

The method 600 of FIG. 6 may be implemented by a processor, such as processor 230 in FIG. 2. The method 600 may be instructed by instructions stored in a non-transitory computer-readable storage medium, such as the memory 220. These instructions may be executed by the processor to perform the method.

Figure 7:
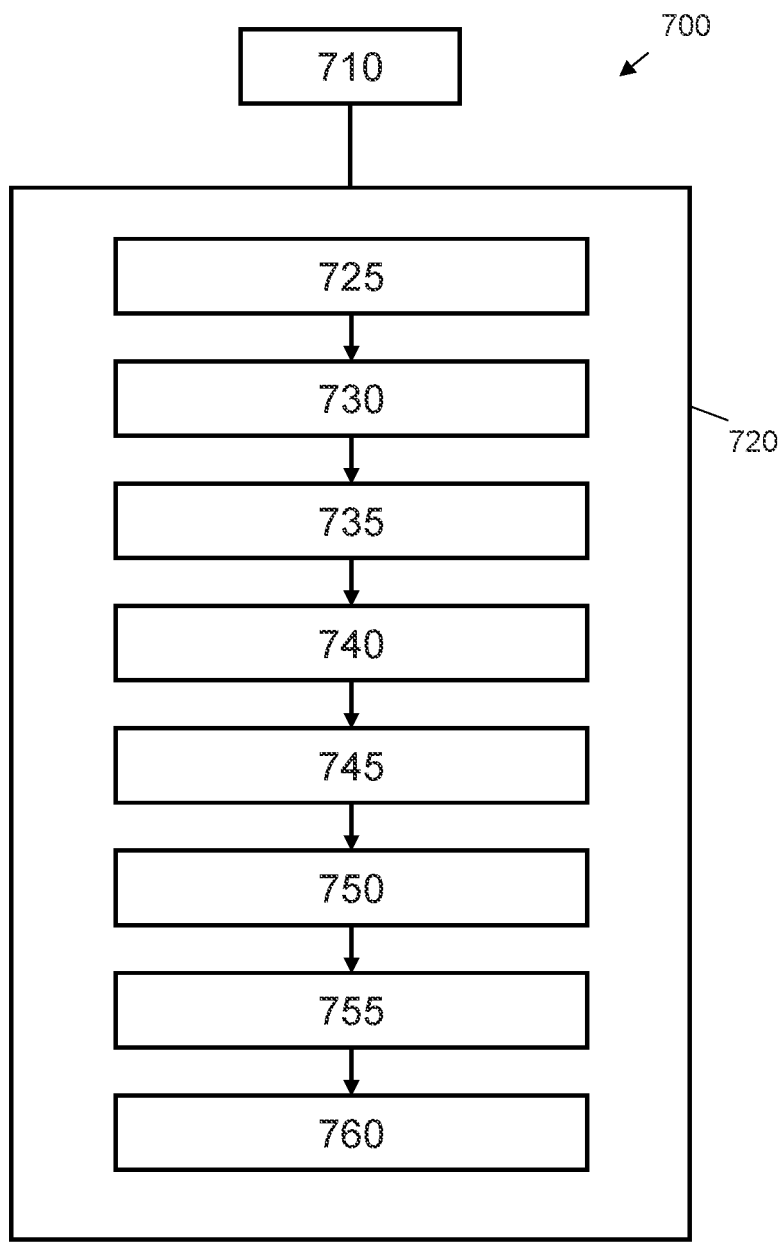
FIG. 7 shows a computer-readable medium storing instructions according to an example.

FIG. 7 shows another example 700 of a processor 710 that is arranged to execute instructions stored on a non-transitory computer-readable storage medium 720. The storage medium 720 may comprise volatile or non-volatile memory, such as Random-Access Memory. The storage medium 720 may alternatively comprise non-volatile data storage such as a hard disk drive or solid-state memory. In one case, the processor 710 and storage medium 720 may form part of a fuel control system for a marine vessel. In this case, the processor 710 and storage medium 720 may form part of an embedded computing system. In another case, the processor 710 and storage medium 720 may form part of a fuel control system that is implemented at a ground control centre.

Via instruction 725, the processor 710 is instructed to obtain data identifying a marine vessel and data identifying a voyage to be undertaken by the marine vessel. This may comprise retrieving a marine vessel identifier. One or more of the data identifying a marine vessel and the data identifying a voyage to be undertaken by the marine vessel may be retrieved from the storage medium 720 or another memory. In one case, these instructions may comprise obtaining a data array comprising a tuple with [data_vessel, data_voyage]. Via instruction 730, the processor 710 is instructed to determine a class of the marine vessel from the data identifying the marine vessel. In one case, the data identifying the marine vessel may comprise the class of the marine vessel; in another case, the data identifying the marine vessel may be used to retrieve the class of the marine vessel, e.g. using an application programming interface (API) call. Via instruction 735, the processor 710 is instructed to determine a voyage leg identifier, a voyage duration, and a voyage speed based on the data identifying the voyage. Again, in one case, the data identifying the voyage may comprise this data, or in another case this data may be retrieved or calculated using the data identifying the voyage. Via instruction 740, the processor 710 is instructed to obtain initial fuel consumption estimates for each of a first fuel type and a second fuel type. The initial fuel consumption estimates may be based on a fuel consumption rate at the voyage speed for the marine vessel and the voyage duration. In one case, the initial fuel consumption estimates may be calculated based on data similar to that shown in FIG. 5, where a different set of data is provided for each fuel type.

Execution of instructions 725 to 740 may result in the generation of one or more input arrays to be used for execution of later instructions. In one case, the input array may comprise data such as [VC, L, s, d, LFC] as described above. A separate input array may be provided for each fuel type, where initial entries in the array are common to a first input array (e.g. VC, L, s, and d).

Via instruction 745, the processor 710 is instructed to apply a first predictive model to output an adjusted fuel consumption estimate for the first fuel type. The first predictive model in this example is a parameterised function of the initial fuel consumption estimate for the first fuel type, the class of the marine vessel, the voyage leg identifier, the voyage duration, and the voyage speed (e.g. the input array as described above). In one case, any string or number identifiers may be mapped to integer values as also described above. The first predictive model comprises a set of parameters. These parameters are optimised based on historical data for a plurality of marine vessels and a plurality of voyages. For example, values for the parameter may result from training the predictive model on the historical data. The historical data may comprise data samples with an input array of a similar form to that previously described (e.g. forming part of an array X) and a record fuel consumption for the first fuel type (e.g. y=[$FC_1$]). Data samples may be batched for training. Training may comprise training the predictive model on a large number of data samples (e.g. at least 1000, at least 10,000 or more). In one case, during training, the first predictive model may be configured to receive a multiple dimensional array or matrix X having a size of 5 by the number of data samples (per batch) and a "ground truth" output vector Y having a size of 1 by the number of data samples (per batch).

Via instruction 745, the processor 710 is instructed to apply a second predictive model to output an adjusted fuel consumption estimate for the second fuel type. This may comprise similar operations to instruction 750. The second predictive model is a parameterised function of the initial fuel consumption estimate for the second fuel type, the class of the marine vessel, the voyage leg identifier, the voyage duration, and the voyage speed. Parameters for the second predictive model are also optimised based on the historical data. The format of the historical data may be similar to that used for the first predictive model, but with an initial fuel consumption estimate for the second fuel type and a "ground truth" fuel consumption measurement for the second fuel type (e.g. y=[$FC_2$] instead of the first fuel type).

Following execution of instructions 745 and 750, the processor 710 has access to fuel consumption estimates for the marine vessel for the voyage for each fuel type. These estimates may be for a particular network leg in a shipping route. Via instruction 755, the processor 710 is instructed to determine an amount of fuel of the first fuel type to supply to the marine vessel based on the adjusted fuel consumption estimate for the first fuel type. In certain cases, this instruction may also comprise instructing the supply of the amount of fuel of the first fuel type. Via instruction 760, the processor 710 is instructed to determine an amount of fuel of the second fuel type to supply to the marine vessel based on the adjusted fuel consumption estimate for the second fuel type. In certain cases, this instruction may also comprise instructing the supply of the amount of fuel of the second fuel type. Instructing the supply of an amount of fuel may comprise sending data indicating fuel amounts to a fuel supply control system. The fuel supply control system may be part of the marine vessel or external to the marine vessel. In certain cases, instructions 745 and 750 may be repeated to generate aggregate fuel consumption estimates for multiple network legs of a voyage. In this case, via instructions 755 and 760, fuel of both fuel types may be supplied for a trip or round trip comprising multiple network legs.

Certain examples have been described featuring methods and systems that generate fuel consumption estimates for marine vessels. These examples use predictive models to compute the estimates. These predictive models may fit parameters based on historical data. The historical data may comprise performance data that is available for a fleet of vessels, e.g. over a period of months or years. The estimates may be used to appropriately supply (i.e. load) a marine vessel with fuel for a voyage over one or more network legs. These estimates may avoid top-up bunkering, e.g. additional emergency refuelling operations. They may also help to optimally load a marine vessel to reduce fuel consumption and improve vessel efficiency, in turn reducing pollution levels. The predictive models may be configured to handle vessels or voyages that have no prior historical data, e.g. following the introduction of new routes and/or new vessels, or significantly retrofitted vessels. Predictive models may comprise terms or coefficients that relate to a general contribution applied for all vessels and network legs, as well as specific contributions relating to specific vessel classes and network legs.

In tests, the fuel consumption estimates computed according to the examples described herein have significantly improved accuracy as compared to legacy fuel control systems. For example, tests indicate reductions in the average error per voyage (e.g. the root-mean squared error of actual fuel consumption minus the fuel consumption estimate) of around 25-30%, depending on fuel type.

It should be noted that although each example has been described individually, features from each example may be combined, features of one example may be combined with features of one or more other examples. Examples of the present invention have been discussed. However, it will be appreciated that variations and modifications may be made to the examples described within the scope of the invention.

What is claimed is:

1. A method comprising:
   obtaining data identifying a marine vessel and data identifying a voyage to be undertaken by the marine vessel;

determining a class of the marine vessel from the data identifying the marine vessel;

determining a voyage leg identifier, a voyage duration, and a voyage speed based on the data identifying the voyage;

obtaining initial fuel consumption estimates for each of a first fuel type and a second fuel type, the initial fuel consumption estimates being based on a fuel consumption rate at the voyage speed for the marine vessel and the voyage duration;

applying a first predictive model to output an adjusted fuel consumption estimate for the first fuel type, the first predictive model being a parameterised function of the initial fuel consumption estimate for the first fuel type, the class of the marine vessel, the voyage leg identifier, the voyage duration, and the voyage speed, parameters for the first predictive model being optimised based on historical data for a plurality of marine vessels and a plurality of voyages;

applying a second predictive model to output an adjusted fuel consumption estimate for the second fuel type, the second predictive model being a parameterised function of the initial fuel consumption estimate for the second fuel type, the class of the marine vessel, the voyage leg identifier, the voyage duration, and the voyage speed, parameters for the second predictive model being optimised based on the historical data;

determining an amount of fuel of the first fuel type to be supplied to the marine vessel based on the adjusted fuel consumption estimate for the first fuel type;

determining an amount of fuel of the second fuel type to supply to the marine vessel based on the adjusted fuel consumption estimate for the second fuel type; and causing a refuelling system to supply fuel based at least in part on one or more of the estimate for the first fuel type or the estimate for the second fuel type.

2. The method of claim 1, comprising:
controlling the supply of the determined amount of fuel to the marine vessel.

3. The method of claim 1, wherein the data identifying the marine vessel comprises an indication of a class of the marine vessel, and the historical data for the plurality of marine vessels comprises indications of class for the plurality of marine vessels.

4. The method of claim 1, wherein the data identifying the voyage to be undertaken comprises an identification of a leg of a voyage, the leg of the voyage having an arrival port and a departure port, wherein the first predictive model is configured to receive the identification of the leg of the voyage as input.

5. The method of claim 4, comprising:
determining a distance between the arrival port and the departure port; and
determining an estimated mean speed of the marine vessel for the voyage,
wherein the first predictive model is configured to receive the distance and the estimated mean speed as inputs.

6. The method of claim 1, wherein the first predictive model is a linear model and parameters of the linear model are fitted using elastic net regularization.

7. The method of claim 1, wherein the first predictive model comprises:
parameters that are independent of the data identifying the marine vessel;
parameters that are dependent on the data identifying the marine vessel;
parameters that are independent of the data identifying the voyage to be undertaken by the marine vessel; and
parameters that are dependent on the data identifying the voyage to be undertaken by the marine vessel.

8. The method of claim 1, comprising:
wherein the first predictive model is configured to receive the initial fuel consumption estimate for the first fuel type as an input.

9. The method of claim 8, wherein the initial fuel consumption estimate is computed from data indicating how fuel consumption varies with speed of the marine vessel.

10. The method of claim 8, wherein the initial fuel consumption estimate is received as a user input.

11. A fuel control system for a marine vessel, comprising:
an interface to receive data identifying the marine vessel and data identifying a voyage to be undertaken by the marine vessel;
a memory to store:
computer program code to implement a first predictive model and a second predictive model;
parameter values for the first predictive model, the parameter values for the first predictive model resulting from an optimisation of the first predictive model using historical data for a plurality of marine vessels and a plurality of voyages; and
parameter values for the second predictive model, the parameter values for the second predictive model resulting from an optimisation of the second predictive model using historical data;
a processor to retrieve the computer program code, the parameter values for the first predictive model and the parameter values for the second predictive model from the memory, the processor being arranged to execute the computer program code to:
instantiate the first predictive model and the second predictive model using the respective parameter values;
determine a class of the marine vessel from the data identifying the marine vessel;
determine a voyage leg identifier, a voyage duration, and a voyage speed based on the data identifying the voyage;
obtain initial fuel consumption estimates for each of a first fuel type and a second fuel type, the initial fuel consumption estimates being based on a fuel consumption rate at the voyage speed for the marine vessel and the voyage duration;
apply the first predictive model to output an adjusted fuel consumption estimate for the first fuel type, the first predictive model being a parameterised function of the initial fuel consumption estimate for the first fuel type, the class of the marine vessel, the voyage leg identifier, the voyage duration, and the voyage speed; and
apply a second predictive model to output an adjusted fuel consumption estimate for the second fuel type, the second predictive model being a parameterised function of the initial fuel consumption estimate for the second fuel type, the class of the marine vessel, the voyage leg identifier, the voyage duration, and the voyage speed; and
a fuel supply system to:
determine an amount of fuel of the first type to be supplied to the marine vessel based on the adjusted fuel consumption estimate for the first fuel type;

determine an amount of fuel of the second fuel type to supply to the marine vessel based on the adjusted fuel consumption estimate for the second fuel type; and cause a refuelling system to supply fuel based at least in part on one or more of the estimate for the first fuel type or the estimate for the second fuel type.

12. A non-transitory computer-readable storage medium storing instructions that, when executed by a processor, cause the processor to:

obtain data identifying a marine vessel and data identifying a voyage to be undertaken by the marine vessel;

determine a class of the marine vessel from the data identifying the marine vessel;

determine a voyage leg identifier, a voyage duration, and a voyage speed based on the data identifying the voyage;

obtain initial fuel consumption estimates for each of a first fuel type and a second fuel type, the initial fuel consumption estimates being based on a fuel consumption rate at the voyage speed for the marine vessel and the voyage duration;

apply a first predictive model to output an adjusted fuel consumption estimate for the first fuel type, the first predictive model being a parameterised function of the initial fuel consumption estimate for the first fuel type, the class of the marine vessel, the voyage leg identifier, the voyage duration, and the voyage speed, parameters for the first predictive model being optimised based on historical data for a plurality of marine vessels and a plurality of voyages;

apply a second predictive model to output an adjusted fuel consumption estimate for the second fuel type, the second predictive model being a parameterised function of the initial fuel consumption estimate for the second fuel type, the class of the marine vessel, the voyage leg identifier, the voyage duration, and the voyage speed, parameters for the second predictive model being optimised based on the historical data;

determine an amount of fuel of the first fuel type to supply to the marine vessel based on the adjusted fuel consumption estimate for the first fuel type;

determine an amount of fuel of the second fuel type to supply to the marine vessel based on the adjusted fuel consumption estimate for the second fuel type; and cause a refuelling system to supply fuel based at least in part on one or more of the estimate for the first fuel type or the estimate for the second fuel type.

\* \* \* \* \*